United States Patent [19]

Shibutani et al.

[11] Patent Number: 5,751,455
[45] Date of Patent: May 12, 1998

[54] OPTICAL TRANSMISSION SYSTEM AND OPTICAL NETWORK TERMINALS USED THEREIN

[75] Inventors: Makoto Shibutani; Katsumi Emura, both of Tokyo, Japan

[73] Assignee: NEC Corporation, Tokyo, Japan

[21] Appl. No.: 742,685

[22] Filed: Oct. 31, 1996

Related U.S. Application Data

[62] Division of Ser. No. 178,803, Jan. 7, 1994, abandoned.

[30] Foreign Application Priority Data

Jan. 7, 1993 [JP] Japan ................................. 5-913
Jun. 3, 1993 [JP] Japan .............................. 5-133046

[51] Int. Cl.⁶ ............................................. H04J 14/02
[52] U.S. Cl. ................... 359/126; 359/157; 359/179; 359/173
[58] Field of Search ........................... 359/127, 157, 359/173, 176, 179, 118, 126

[56] References Cited

U.S. PATENT DOCUMENTS

| | | | |
|---|---|---|---|
| 4,236,243 | 11/1980 | Davies et al. | 370/3 |
| 4,742,976 | 5/1988 | McMahon | 359/119 |
| 5,566,381 | 10/1996 | Korotky | 359/183 |

FOREIGN PATENT DOCUMENTS 2165115  4/1986  United Kingdom .................. 359/156

*Primary Examiner*—Kinfe-Michael Negash
*Attorney, Agent, or Firm*—Sughrue, Mion, Zinn, Macpeak & Seas, PLLC

[57] ABSTRACT

An optical transmission system of an N : 1 or an N:N type is provided, in which there is no deterioration caused by beat noise between signals. A plurality of optical modulators are cascaded in an optical fiber transmission path having a light source and a plurality of light receivers connected to two respective ends of the optical fiber transmission path, and carrier waves having frequencies respectively different are applied to the optical modulators. This enables the light receivers to receive a radio frequency signal in which the carrier waves are frequency-multiplexed. The light receivers receive only the signal beam so that there is no occurrence of beat noise. In another arrangement, at the optical network terminal, a part of a signal beam is split and the split beam is intensity-modulated responsively to carrier waves by an optical modulator and, thereafter, is combined again to a passing beam. It is possible to obtain at the signal beam receiver a received signal in which carrier waves from respective optical network terminals are frequency-multiplexed. This prevents occurrence of inter-modulation distortion in the cascaded optical modulators.

8 Claims, 10 Drawing Sheets

OPTICAL TRANSMISSION SYSTEM AND OPTICAL NETWORK TERMINALS USED THEREIN

This is a divisional of application Ser. No. 08/178,803 filed Jan. 7, 1994 now abandoned.

BACKGROUND OF THE INVENTION

(1) Field of the Invention

The present invention relates to an optical communication network, and more particularly to an optical transmission system for realizing an optical communication network of an N : 1 type or an N : N type, and to optical network terminals used therein.

(2) Description of the Related Art

In the past, as one of the systems for realizing an optical communication network of an N : 1 type or an N : N type in which a plurality of transmission terminals and one or a plurality of receiving terminals are interconnected through an optical fiber network, there have been studies and research on an optical multiple-access system in which a sub-carrier multiplex transmission system is utilized.

In the above system, N number of transmission terminals output signal beams which have been modulated by carrier waves whose frequencies are different respectively among the terminals. These signal beams are then combined together by an optical fiber network, inputted into a receiving terminal and converted into radio frequency signals (high frequency signals) by light receiving elements. In these radio frequency signals, N number of carrier waves having different frequencies are frequency-multiplexed. Therefore, by causing a desired one of the carrier waves from among the N number of carrier waves to be taken out by a tuner and be demodulated, the receiving terminal is able to receive a transmission signal from a desired transmission terminal.

An optical multiplex-access system which utilizes such a sub-carrier multiplex transmission system as explained above has been disclosed, for example, by M. Shibutani et al on "Optical Transmission Networks for Wide Area Video Monitoring Systems" published in a report of The Institute of Electronics, Information and Communication Engineers (IEICE), OCS 92-25 (1992).

In the optical multiple-access system utilizing the above described sub-carrier multiplex transmission system, a plurality of signal beams are multiplexed on the optical fiber network. When the wavelengths of these signal beams overlap or nearly overlap, noise (beat noise) occurs at the receiving terminals due to beats between these signal beams, which may sometimes lead to a complete inability to receive the transmission signals.

Thus, in order to prevent the occurrence of such beat noise, it becomes necessary to control the wavelengths of the light source, but to do so involves such problems as complicating the networks, increasing the cost, and limiting the number of connectable transmission terminals. The problems caused by beat noise in an optical multiple-access system using the sub-carrier multiplex transmission system as above have been explained in the report by M. Shibutani et al referred to above.

There is a further problem which relates to the occurrence of intermodulation distortion and which develops when the signal beam modulated by a certain optical modulator is further modulated by another optical modulator. As to the intermodulation distortion in cascaded optical modulators, information is available from a report by W. Domon et al under "SCM Optical Multiple-Access Networks with Cascaded Optical Modulators", The Institute of Electronics, Information and Communication Engineers, SB-9-4 (Published on Mar. 31, 1993).

SUMMARY OF THE INVENTION

An object of the invention is to realize a multiple-access network utilizing a sub-carrier multiplex system in which beat noise does not occur.

Another object of the invention is to realize an optical multiple-access network in which not only the occurrence of beat noise can be avoided but also the occurrence of intermodulation distortion in the cascaded optical modulators is avoided.

A further object of the invention is to realize optical multiple-access networks in which, even when a part of the optical modulators or the optical amplifiers is in trouble, the network themselves continue functioning, thereby enhancing the reliability of the overall networks.

According to the first aspect of the invention, a plurality of optical modulators are cascaded in an optical fiber transmission path, and carrier waves having frequencies respectively different are applied to the optical modulators. The signal beam from the light source is subjected to intensity modulation by the carrier waves each time it passes each of the optical modulators, then is inputted to the light receiver and converted to a radio frequency signal. In this radio frequency signal, the carrier waves applied to the respective optical modulators are frequency-multiplexed so that any desired carrier wave may be taken out by a tuner and be demodulated. Thus, similarly as in the conventional optical multiple-access system using a sub-carrier multiplex transmission system, it is possible to receive any desired data from among those transmitted from the respective optical modulators. Moreover, since only a single signal beam is transmitted in the arrangement according to this invention, there is no possibility for the beat noise to occur unlike in the conventional arrangement.

According to the second aspect of the invention, a plurality of the signal beams are transmitted through a plurality of optical fiber transmission paths in which the optical modulators are cascaded. The signal beams then are combined at the beam combiner and the beam thus combined is received by the light receiver. However, the minimum value of the optical frequency intervals in the plurality of the signal beams is larger than the highest frequency of the carrier waves. In this case, the beat noise occurs at the lower frequency side relative to the carrier waves. Thus, the carrier waves are not influenced by the beat noise.

According to the third aspect of the invention, a plurality of the signal beams are transmitted through a plurality of optical fiber transmission paths in which the optical modulators are cascaded. The signal beams then are combined at the beam combiner and the beam thus combined is received by the light receiver. However, the maximum value of the optical frequency intervals in the plurality of the signal beams is smaller than the lowest frequency of the carrier waves. In this case, the beat noise occurs at the lower frequency side than the carrier waves. Thus, the carrier waves are not influenced by the beat noise.

According to the fourth aspect of the invention, a plurality of the signal beams are transmitted through a plurality of optical fiber transmission paths in which the optical modulators are cascaded, and then combined at the beam combiner. The beam thus combined is received by the light receiver. However, here the signal beam whose line breadth is wider than the maximum frequency is used. In this case, the beat noise distributes in a wide-band, and the spectrum density of the beat noise to occur in the carrier wave frequency band becomes lower. Thus, the influence that the beat noise gives to the transmission of the carrier waves becomes small.

According to the fifth aspect of invention, a single signal beam is split and the split beams are transmitted through a plurality of optical fiber transmission paths in which the optical modulators are cascaded. The signal beams are combined at the beam combiner, and the beam thus combined is received by the light receiver. In this case, the beams split from the same signal beam pass through different paths and then are combined, and the beat noise distributes in the neighborhood of the direct current. Thus, the carrier waves are not influenced by the beat noise.

According to the sixth aspect of the invention, a plurality of terminals each having the optical modulator and the light receiver are cascaded in the optical fiber transmission path, and the signal beam transmitted through the optical fiber transmission path is modulated by the transmission signal applied to the light source. At each of the terminals, the signal beam is modulated through the carrier waves by the optical modulator and, at the same time, this signal beam is partially split and the split beam is received by the optical modulator in the terminal. Thus, it is possible for each terminal to send the carrier waves to the light receiver and, at the same time, to receive the transmission signal transmitted from the light source.

According to the seventh aspect of the invention, two light sources are connected to respective two ends of the optical fiber transmission path, and the first and second signal beams outputted respectively from the two light sources are inputted to the optical fiber transmission paths from directions opposite to each other. Also, in the optical fiber transmission path, a plurality of terminals each having the optical modulator and the light receiver are connected in cascade, and the first and the second signal beams are modulated simultaneously at each terminal. Further, at each terminal, the first and second signal beams are partially split and the split beams are received by the light receiver within the terminal. Thus, it is possible for each terminal to transmit the carrier waves to other terminals and, at the same time, to receive the carrier waves from other terminals. That is, according to this seventh invention, it is possible to carry out the data transmission mutually among the terminals.

According to the eighth aspect of the invention, the signal beams are partly split at each network terminal and modulated by the optical modulator. A majority of the signal beams as they are pass through the optical network terminals. For this reason, even when the optical modulators are in trouble, the majority of the signal beams are unaffected and pass through the optical network terminals. Thus, even when a part of the optical modulators is out of order, there is no possibility for the entire optical networks to stop functioning and this ensures realizing highly reliable optical networks.

According to the ninth aspect of the invention, the signal beams are partly split at each optical network terminal and are modulated after passing through the gain saturation medium. Due to the gain saturation medium, the intensity modulation component of the signal beams inputted into each network terminal is suppressed, and the signal beams substantially unmodulated are outputted from the gain saturation medium. When such signal beams are modulated by the optical modulators, any distortion in the cascaded optical modulators is widely or significantly suppressed.

According to the tenth aspect of the invention, each optical network terminal receives simultaneously the signal beams transmitted from the light source and from each optical network terminal. These signal beams have been intensity-modulated by carrier waves inherent to each network terminal but, as they pass through the gain saturation medium, the intensity modulation component thereof is suppressed. Therefore, when the signal beams after their passage through the gain saturation medium are intensity-modulated by the optical modulator, there is no occurrence of any distortion caused by interference or intermodulation between the carrier waves.

Each of the arrangements according to the first to seven aspects of the invention described above provides an optical multiple-access network using a sub-carrier multiplex system, which is free from the occurrence of beat noise.

Also, each of the arrangements according to the eighth to tenth aspects of the invention described above provides a sub-carrier multiple-access network which is highly reliable with low distortion and without beat noise.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the present invention will be explained hereunder with reference to the accompanying drawings.

Figure 1:
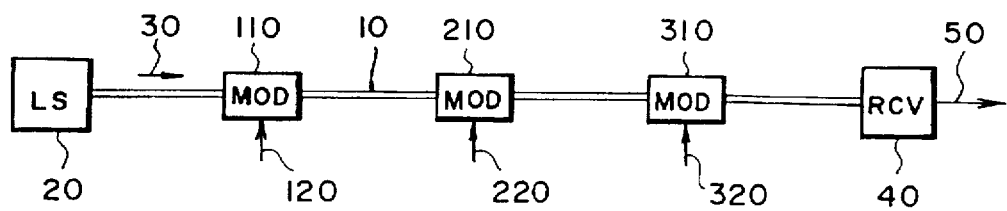
FIG. 1 is a basic block diagram of an optical transmission system according to the invention.

FIG. 1 shows in block diagram a basic configuration of the optical transmission system according to the invention. In FIG. 1, three optical modulators (MODs) 110, 210, 310 are inserted in cascade in an optical fiber transmission path 10, and carrier waves 120, 220, 320 whose frequencies are different respectively are applied to the optical modulators 110, 210, 310. A signal beam 30 outputted to the optical fiber transmission path 10 from a light source (LS) 20 is subjected to intensity modulation through the carrier waves 120, 220, 320 when it passes through the optical modulators 110, 210, 310. The signal beam 30 is received by a light receiver (RCV) 40 after passing through the optical fiber transmission path 10 and is converted to a radio frequency signal 50. In this way, the radio frequency signal 50 in which the carrier waves 120, 220, 320 are frequency-multiplexed is obtained at the light receiver 40. In this case, since the light receiver 40 receives only the signal beam 30, there is no possibility for the occurrence of the beat noise unlike the case wherein the problem was cause by the reception of a plurality of signal beams.

Figure 2:
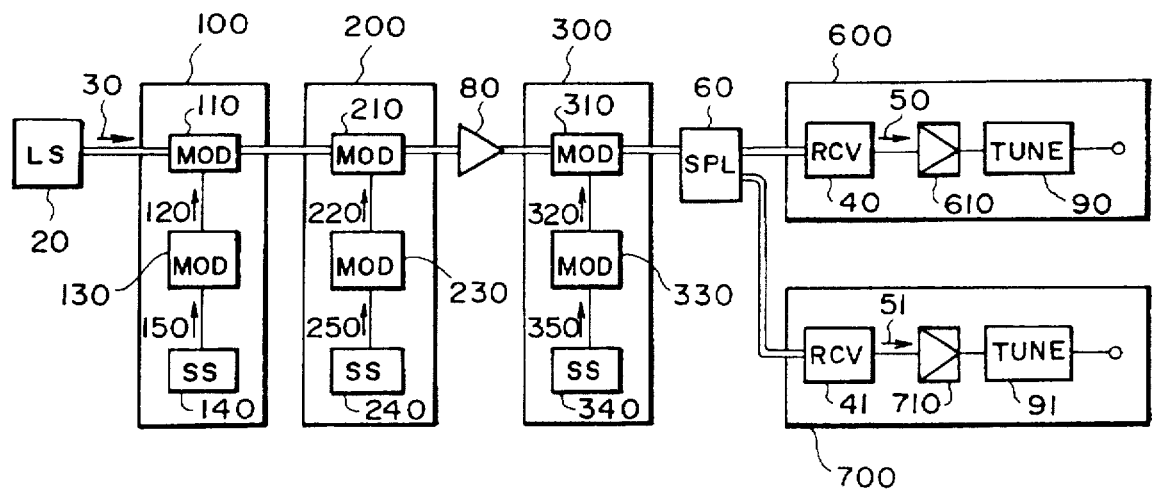
FIG. 2 is a block diagram of a system of a first embodiment according to the invention.

FIG. 2 is a block diagram illustrating a first embodiment according to the invention. In the optical fiber transmission path 10, there are provided signal transmission terminals (TERM) 100, 200, 300 which are connected in cascades and which respectively include optical modulators (MODs) 110, 210, 310, radio frequency modulators (MODs) 130, 230, 330 and signal sources (SS) 140, 240, 340. A low-distortion distributed-feedback laser diode (DFB-LD) with 1.5 μm-wavelength is used as a light source 20. A signal beam 30 is split into two by a beam splitter (SPL) 60 upon passing through the signal transmission terminal 300 and the split or separated signal beams are received respectively by signal receiving terminals 600, 700 having respectively light receivers (RCV) 40, 41 and tuners (TUNE) 90, 91. In this embodiment, as an optical amplifier 80, an erbium doped optical fiber amplifier is inserted between the signal transmission terminals 200 and 300. Information concerning this optical fiber amplifier is found, for example, in a report by S. Sentsui et al under the title "Dynamic Gain Characteristics of Erbium-Doped Fiber Amplifier for Optical CATV", published by The Institute of Electronics, Information and Communication Engineers, Research Report OCS 90-24.

In this embodiment, in the signal transmission terminals 100, 200, 300, television cameras are used as signal sources 140, 240, 340 and FM modulators for use in satellite broad casting are used as radio frequency modulators 130, 230, 330. The radio frequency modulators 130, 230, 330 respectively output carrier waves 120, 220, 320 having frequencies of 1049.48 MHz, 1087.84 MHz, 1112.62 MHz, respectively. The carrier waves are frequency-modulated by base-band signals 150, 250, 350 outputted from the signal sources 140, 240, 340, respectively. As the optical modulators 110, 210, 310, Ti:LiNbO$_3$ optical intensity modulators (LN optical intensity modulators) of a Mach-Zehnder type are used. Information concerning this LN optical modulator is found, for example, in a report by M. Doi et al under "Fabrication of Highly Stable LiNbO$_3$ Analog Modulator", 1992, The Institute of Electronics, Information and Communication Engineer, Autumn Conference, C-171. To these optical modulators 110, 210, 310, a DC bias voltage is applied to lower the output level from the input level by 3 dB and also the carrier waves 120, 220, 320 are applied. In this way, the signal beam 30 is subjected to intensity modulation by a modulation degree of 5% each time the signal beam 30 passes each optical modulator.

A Pin-photodiode is used for each of light receivers 40, 41 in the receiving terminals 600, 700. The radio frequency signals 50, 51 outputted from the above are amplified by radio frequency amplifiers 610, 710 and then inputted to the tuners 90, 91 for use in satellite broadcasting. At the tuners 90, 91, one wave (one station) from among the carrier waves 120, 220, 320 multiplexed to the radio frequency signals 50, 51 is selected and demodulated and a predetermined wave from among the base band signals 150, 250, 350 is outputted.

In the example of this embodiment, each length of the optical fiber between the light source 20, the signal transmitting terminals 100, 200, 300 and the signal receiving terminals 600, 700 was 5 km and the light loss in such optical fiber was 2 dB. Also, the output level of the light source 20 was 6 dBm, the loss at the optical modulators 110, 210, 310 was 6 dB, the gain of the optical amplifier 80 was 15 dB, and the loss at the beam splitter 60 was 4 dB. Therefore, the signal beam of −9 dBm was inputted to the signal receiving terminals 600 and 700. At this time, the picture signal having a picture quality so high as over 48 dB in the signal-to-noise ratio (SN ratio) was outputted from the tuners 90 and 91.

In the first embodiment explained above, the LN optical modulators were used as the optical modulators 110, 210, 310 but other type modulators such as semiconductor type modulators may well be used. Also, optical switches can be used as optical modulators. Information concerning the semiconductor type modulators is found, for example, in a report by M. Kagami et al on "50 TV-channel FM-FDM long span transmission experiment using MQW electroabsorption modulator", 1992, The Institute of Electronics, Information and Communication Engineers, Autumn Conference, B-713. Also, information concerning use of optical switches for optical modulators is available from, for example, a report by K. Shimomura et al on "Reflection and Transmission Characteristics of Intersectional Optical Switch/ Modulator", 1989, The Institute of Electronics, Information and Communication Engineers, Spring Conference, C-470. Also, although the erbium doped optical fiber amplifier was used as the optical amplifier 80, other amplifiers such as semiconductor optical amplifier may well be used. Information concerning such semiconductor optical amplifiers is available from, for example, a report by I. Cha et al on "1.5 μm Band Traveling Wave Optical Amplifier with Window Facet Structure", 1989, The Institute of Electronics, Information and Communication Engineers, Spring Conference, C409.

Figure 3:
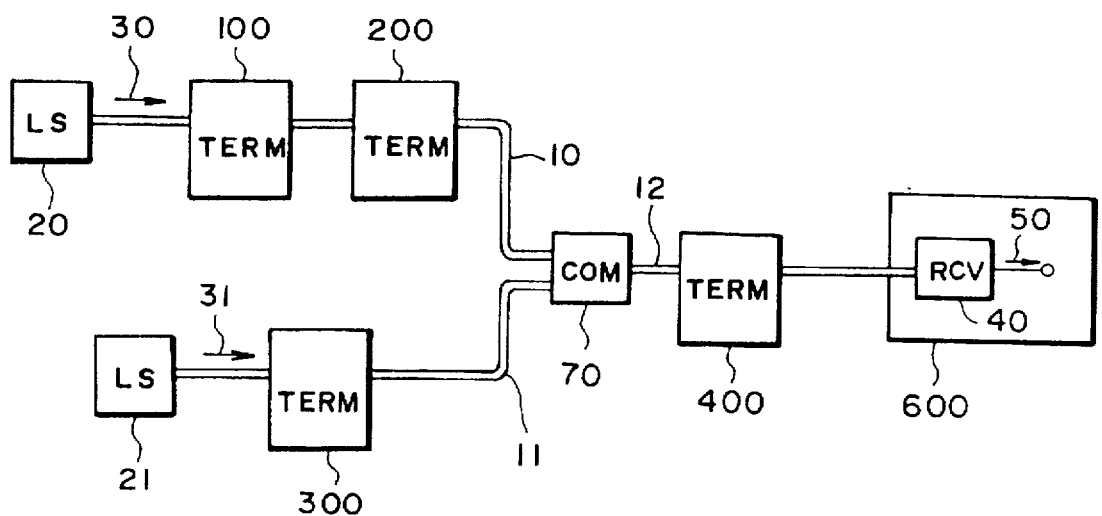
FIG. 3 is a block diagram common to systems of a second, third and fourth embodiment according to the invention.

FIG. 3 shows in block diagram a second embodiment of the invention. In this embodiment, a plurality of light sources having different wavelengths are used. In FIG. 3, the signal beams 30, 31 outputted respectively from the two light sources 20, 21 pass through the optical transmission paths 10, 11, are combined together at a combiner (COM) 70 and then inputted to the signal receiving terminal 600 after passing through the optical fiber transmission path 12. The transmission terminals 100, 200 are provided in the optical fiber transmission path 10, the transmission terminal 300 is provided in the optical fiber transmission path 11, and the transmission terminal 400 is provided in the optical fiber transmission path 12. These terminals here are the same as those used in the first embodiment and the carrier wave frequencies at the transmission terminals 100, 200, 300 and 400 were respectively 1049.48 MHz, 1087.84 MHz, 1112.62 MHz and 1164.56 MHz.

Figure 4:
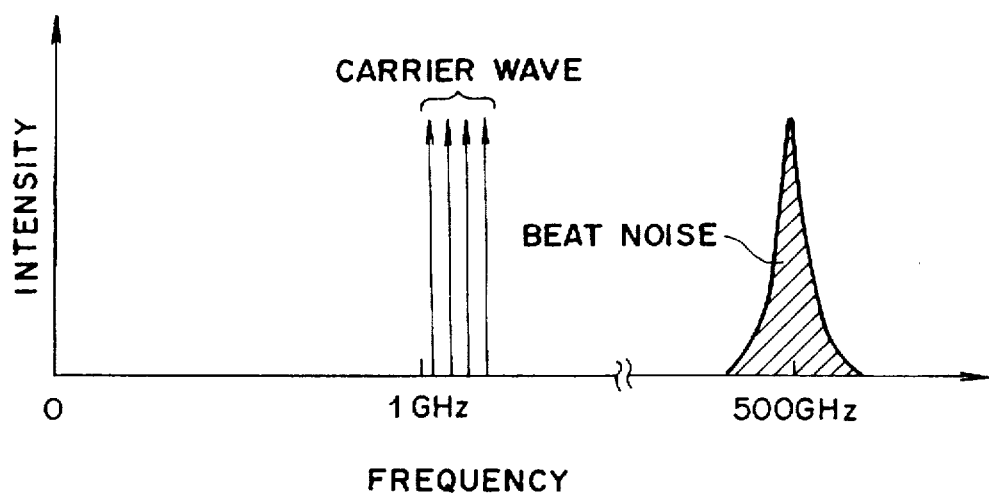
FIG. 4 is a frequency spectrum diagram of receiving signals in the second embodiment of the invention.

FIG. 4 shows frequency spectra of the radio frequency signal 50 at the receiving terminal 600 in the second embodiment. Here, the light sources 20, 21 employed DFB LDs having oscillation wavelengths of 1.510 μm and 1.514

µm, respectively. In this case, since the wavelength distance between the signal beam 30 and the signal beam 31 is 4 nm, the beat noise occurs at and in the vicinity of about 500 GHz as shown in FIG. 4. Therefore, there is no possibility for such beat noise to have an influence on the carrier waves existing at and in the vicinity of such frequency as 1 GHz.

Figure 5:
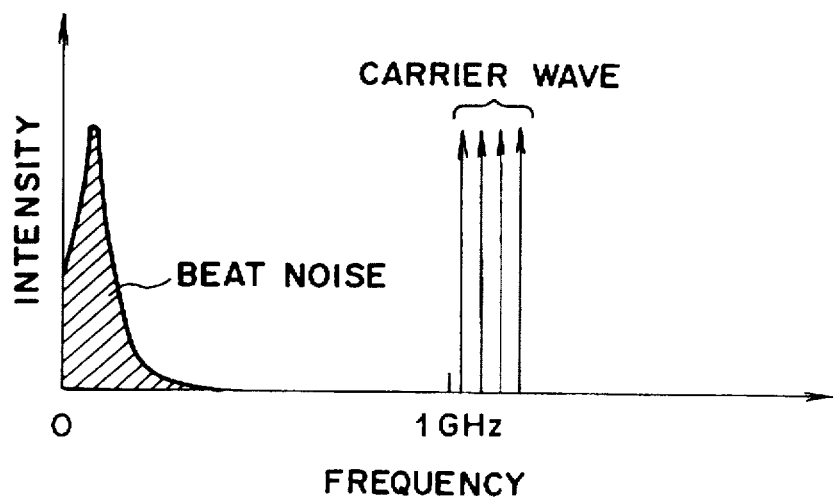
FIG. 5 is a frequency spectrum diagram of receiving signals in the third embodiment of the invention.

A third embodiment is structurally common to the second embodiment shown in FIG. 3, and the wavelengths at the light source 20 and the light source 21 are the same with each other. FIG. 5 shows frequency spectra of the radio frequency signal 50 at the receiving terminal 600. In this embodiment, the wavelengths of the light sources 20, 21 are controlled and the optical frequency difference of the signal beams 30, 31 is suppressed to below 100 MHz. In this case, as shown in FIG. 5, the beat noise occurs in frequencies below about 100 MHz so that there is no possibility for the beat noise to have an influence on the carrier waves existing at or in the neighborhood of 1 GHz. As to the wavelength control of the light source, information is found, for example, in a report by Y. Sakai et al on "Absolute Frequency Stabilized DFB Laser Compact Module Using 1.53159 µm Optical Absorption Line due to $C_2H_2$ Gas", 1989, The Institute of Electronics, Information and Communication Engineers, Autumn Conference, B-464.

Figure 6:
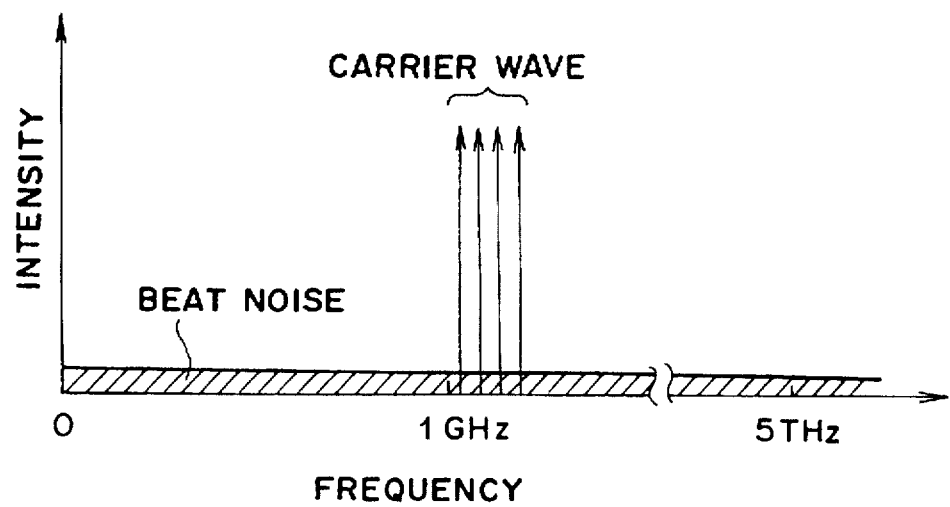
FIG. 6 is a frequency spectrum diagram of receiving signals in the fourth embodiment of the invention.

In a fourth embodiment which is also structurally common to the second embodiment shown in FIG. 3, a light source having a very large line breadth was used. FIG. 6 shows frequency spectra of the radio frequency signal 50 at the receiving terminal 600. In this embodiment, the light sources 20, 21 employed superluminescent diodes each having a line breadth of 20 nm. As shown in FIG. 6, since the distribution of the beat noise is substantially uniform over a range upto and beyond 5 THz, the beat noise density within the signal receiving band region of the carrier waves is very low so that there is almost no possibility for the beat noise to have an influence on the signal transmission. As to the superluminescent diodes as used for the light sources 20, 21, information is found, for example, in a report by Y. Kashima et al on "High Coupling Efficiency Superluminescent Diode", 1989, The Institute of Electronics, Information and Communication Engineers, Spring Conference, C-429.

Figure 7:
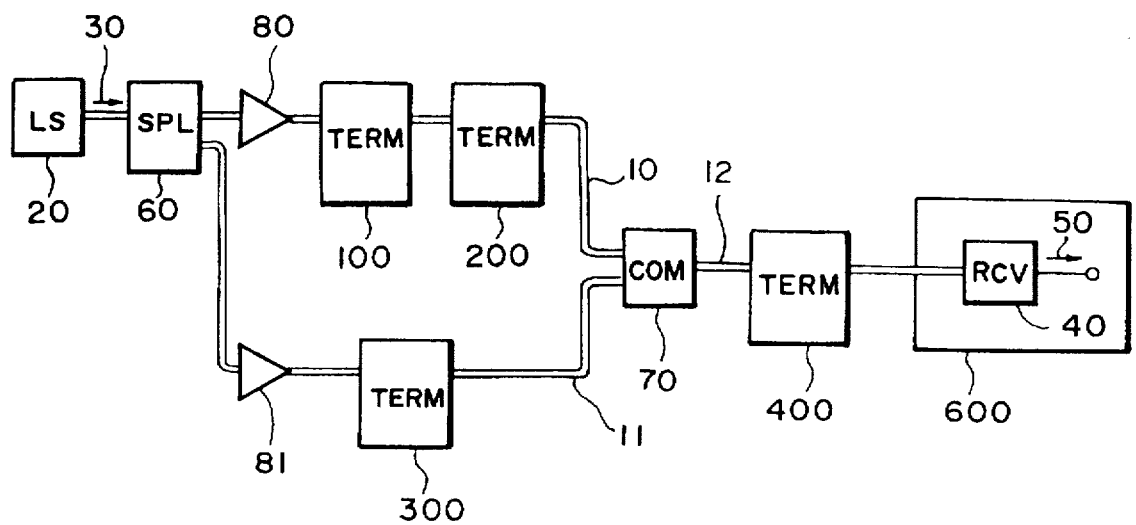
FIG. 7 is a block diagram of a system of a fifth embodiment according to the invention.
Figure 8:
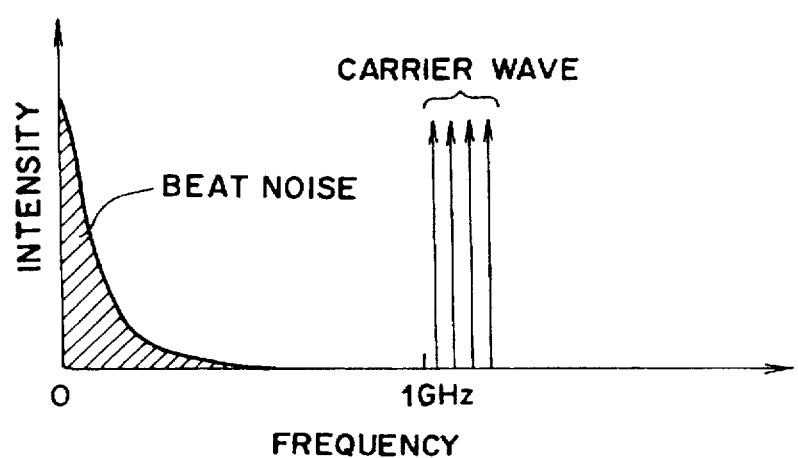
FIG. 8 is a frequency spectrum diagram of receiving signals in the fifth embodiment of the invention.

FIG. 7 is a block diagram showing a fifth embodiment of the invention. In this embodiment, the output of the single light source 20 is split whereby a plurality of signal beams having the same wavelength are obtained. In FIG. 7, the signal beam 30 outputted from the light source 20 is split into two beams by a beam splitter 60 and such beams are amplified by the optical amplifiers 80, 81 and outputted to the optical fiber transmission paths 10, 11, respectively. The signal beams 30 having passed the optical fiber transmission paths are again combined together at the beam combiner 70 and the beams thus combined are inputted to the receiving terminal 600 after passing through the optical fiber transmission path 12 via the transmission terminal 400. In order to avoid the occurrence of interference in the signal beams 30 when they are combined, there is provided between the two optical fiber paths 10, 11 an optical path difference not less than 100 m. FIG. 8 shows frequency spectra of the radio frequency signal 50 at the receiving terminal 600 in the arrangement of this fifth embodiment.

FIG. 8 shows that, in this embodiment, the beat noise centers around the DC region so that there is no possibility for the beat noise to affect the carrier waves near the frequency 1 GHz.

Figure 9:
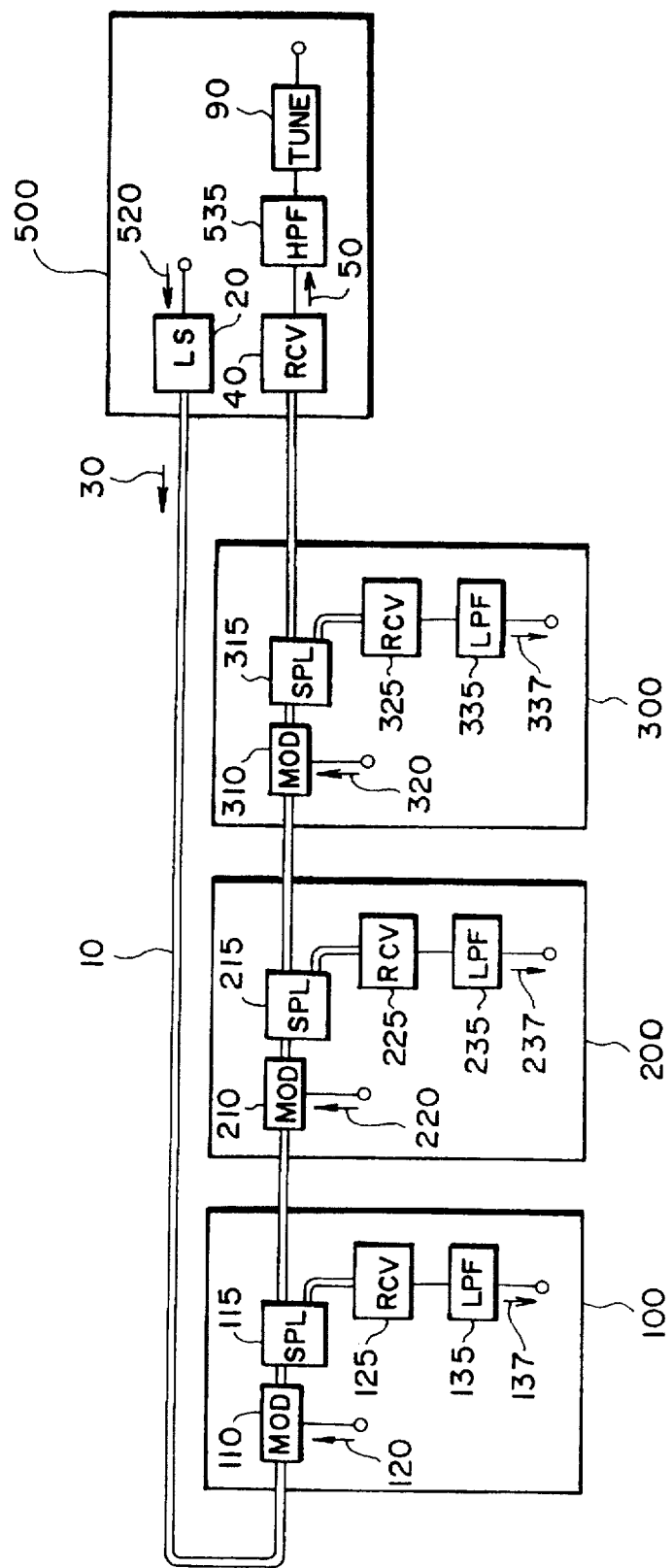
FIG. 9 is a block diagram of a system of a sixth embodiment according to the invention.

FIG. 9 is a block diagram showing a sixth embodiment. In this embodiment, it is so arranged that data can be transmitted mutually between a network center 500 and the transmission terminals 100, 200 and 300. In FIG. 9, the light source 20 is provided in the network center 500 and the light source 20 is modulated by the transmission signal 520. In this embodiment, the transmission signal 520 employs a base band digital signal of a bit rate 2 Mbps. The signal beam or beams 30 are caused to be subjected to intensity modulation at the extinction ratio of 4 : 5 by the transmission signal 520. The signal beam 30 passes through the transmission terminals 100, 200, 300 which are coupled to the optical fiber transmission path 10 in cascades and is again inputted to the network center 500.

The transmission terminals 100, 200, 300 modulate the signal beam 30 by respective carrier waves 120, 220, 320. The frequencies of the carrier waves 120, 220 and 320 were respectively 1049.48 MHz, 1087.84 MHz and 1112.62 MHz.

Simultaneously with the above, the transmission terminals 100, 200, 300 cause a part of the signal beam 30 to be split by the splitters 115, 215 and 315 and the split beams of the signal beam 30 are received by the light receivers 125, 225 and 325. Also, the low frequency components of the outputs of the light receivers 125, 225, 325 are taken out by using low-pass filters (LPFs) 135, 235, 335 each having a cut-off frequency of 2 MHz. In this way, it is possible for each of the transmission terminals 100, 200, 300 to receive the transmission signal 520 sent from the network center 500. On the other hand, at the network center 500, the light receiver 40 receives the signal beam 30 and the high frequency components of the output of the light receiver 40 are taken out by using a high-pass filter (HPF) 535 having a cut-off frequency of 2 MHz and forwarded to a tuner 90. In this way, it is possible to receive carrier waves 120, 220, 320 sent from the transmission terminals 100, 200, 300.

Although, in this embodiment, the base band digital signal with a bit rate 2 Mbps has been used as the transmission signal 520 from the network center 500, other kinds of signals may well be used insofar as there is no influence to the transmission of the carrier waves 120, 220, 320. For example, the carrier waves with a frequency of 1.5 MHz modulated by the digital signal with a bit rate 64 kbps may be used as the transmission signal 520.

As above, the arrangement according to this sixth embodiment enables transmission of data mutually between the network center and the transmission terminals and, by using this arrangement, it is possible to control, for example, carrier wave frequencies of the respective transmission terminals from the network center, thereby realizing the so called "demand assign type systems". The demand assign type is a technology widely used in such system as those for satellite communication systems. Such information is found, for example, in a reference edited by K. Miyamoto under the title "Satellite technology, new version" published by Lattice Company.

Figure 10:
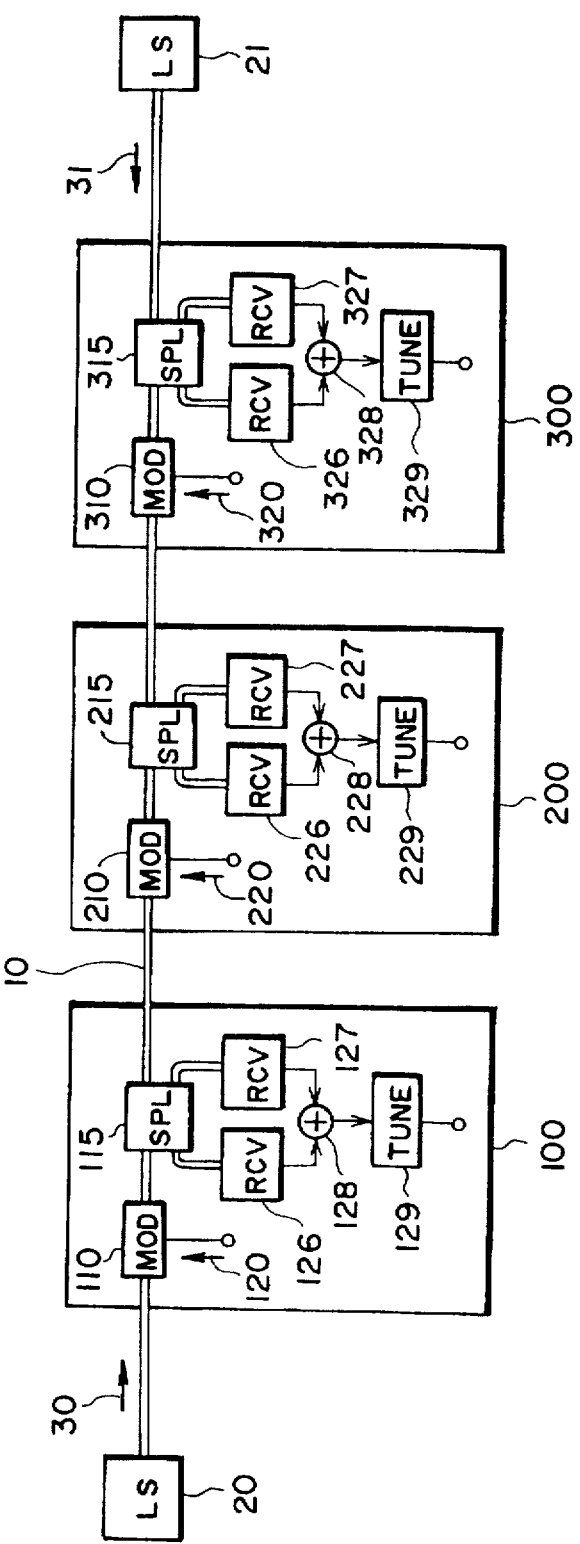
FIG. 10 is a block diagram of a system of a seventh embodiment according to the invention.

FIG. 10 is a block diagram illustrating a seventh embodiment of the invention. This embodiment enables transmission of data mutually between the terminals. In FIG. 10, the light sources 20, 21 are connected to both ends of the optical fiber transmission path 10, respectively, and these light sources 20, 21 output the signal beam 30 and the signal beam 31 which have wavelengths of 1.510 µm and 1.514 µm, respectively. Transmitting/receiving terminals 100, 200, 300 are connected in cascades in an intermediate portion of the optical fiber transmission path 10.

In the transmitting/receiving terminal 200, the signal beam 30 and the signal beam 31 are caused to be modulated simultaneously by the carrier waves 220. In the transmitting/ receiving terminal 200, the signal beams 30, 31 are partly split by the splitter 215. In this embodiment, the splitter 215 employs an optical fiber coupler having four input/output ports. The light receiver 226 receives a part of the signal beam 31 and the output thereof contains the carrier wave 320 from the transmitting/receiving terminal 300. The light receiver 227 receives a part of the signal beam 30 and the output thereof contains the carrier waves 120 from the transmitting/receiving terminal 100. The outputs of the light receivers 226, 227 are combined by the radio frequency combiner 228 and are inputted to the tuner 229. By selecting and demodulating a desired carrier wave (or station) from among radio frequency signals inputted to he tuner 229, the transmitting/receiving terminal 200 is enabled to receive data from the transmitting/receiving terminal 100 or the transmitting/receiving terminal 200.

Similarly, the transmitting/receiving terminals 100, 300 modulate the signal beam 30 and the signal beam 31 simultaneously by the respective carrier waves 120, 320 and send out data to other transmitting/receiving terminals. At the same time, the transmitting/receiving terminals 100, 300 receive the signal beam 30 and the signal beam 31 and receive data from other transmitting/receiving terminals. This arrangement enables the transmitting/receiving terminals 100, 200, 300 to perform mutual transmission of data.

Figure 11:
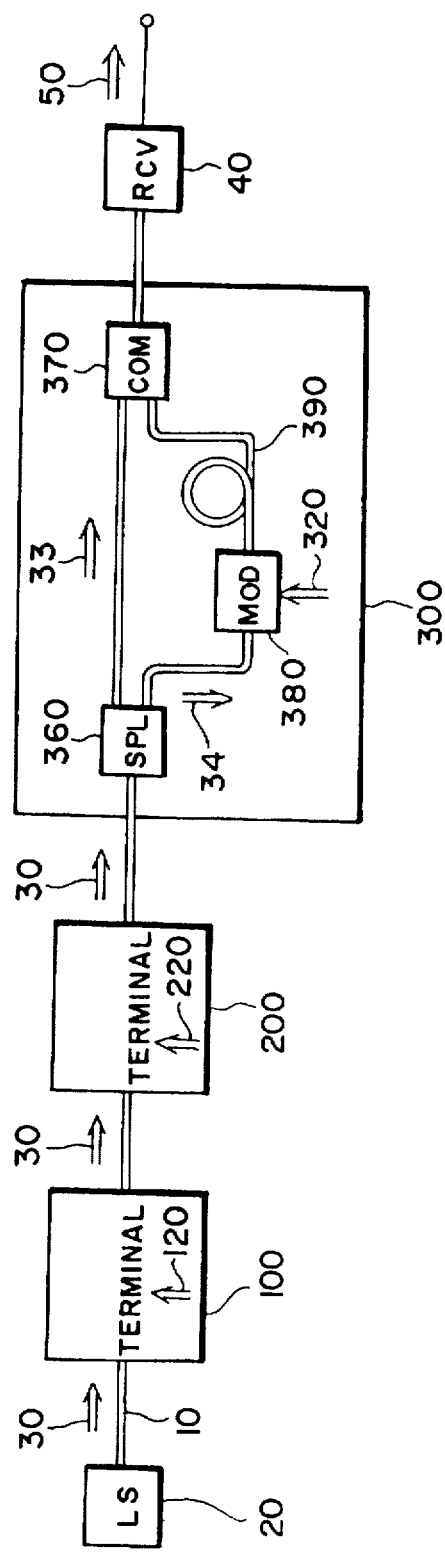
FIG. 11 is a block diagram showing a configuration of optical networks of an eighth embodiment according to the invention.

FIG. 11 is a block diagram showing a configuration of an eighth embodiment according to the invention. A light source 20 and a light receiver 40 are connected respectively to ends of an optical fiber transmission path 10, and three optical network terminals 100, 200, 300 are provided in cascades in the optical fiber transmission path 10. The signal beam 30 outputted from the light source 20 passes through the optical network terminals 100, 200, 300 and are received by the optical signal receiver 40. The optical network terminals 100, 200, 300 all have common internal configurations and common functions so that, for the understanding of these configurations and functions, only the network terminal 300 is explained herein as an example.

At the optical network terminal 300, the signal beams 30 received are split by the beam splitter 360 into passing beams 33 and split beams 34. Carrier waves 320 having a frequency inherent to each optical network terminal are applied to an optical modulator 380, and the split or separated beams 34 are intensity-modulated by the carrier waves 320 when passing through the optical modulator 380. The split beams 34 are combined at the beam combiner 370 with the passing beams 33 after passing through a beam delay line 390.

In this embodiment, the average intensity of the signal beam 30 when inputted to the optical network terminal 300 was 100 µW. Fiber couplers were used as the beam splitter 360 and the beam combiner 370, and the split ratio between the passing beams 33 and the split beams 34 at the beam splitter 360 was 4 : 1. In this example, a semiconductor electroabsorption type optical modulator (E/A optical modulator) was used as the optical modulator 380. As to the E/A optical modulator, information is found in a report by M. Kagami et al on "50 TV-channel FM-FDM long span transmission experiment using MQW electroabsorption modulator", 1992, The Institute of Electronics, Information and Communication Engineers, Autumn Conference, B-713. Optical loss in the optical modulator 380 was −6 dB and the degree of the intensity modulation by the carrier waves 320 was 40%. Also, the combining ratio between the passing beams 33 and the split beams 34 at the beam combiner 370 was 1 : 1. Therefore, the average beam intensity of the passing beams 33 when outputted from the beam combiner 370 was 40 µW. Also, the average intensity of the split beams 34 was 2.5 µW and they were subjected by the carrier waves 320 to the intensity modulation with the zero/peak amplitude being 1 µW. Therefore, the optical loss in the entire optical network terminal 300 was about −3.7 dB and, by passing the optical network terminal 300, the signal beams were subjected to the optical modulation of about 2.4%.

In this embodiment, an optical fiber having a length of 20 m was used as the optical delay line 190. Also, the spectrum line breadth of the signal beam 30 was 20 MHz and the coherence distance (coherence length) was about 1.6 m. Thus, due to the optical delay line 390, the passing beam 33 and the split beam 34 were provided with a beam path length difference which is far greater than the coherence distance with a result that the coherence between the two beams was very low. In this way, it was possible for the passing beam 33 and the split beam 34 to be canceled each other due to the coherence to develop when the two beams are combined.

Figure 12:
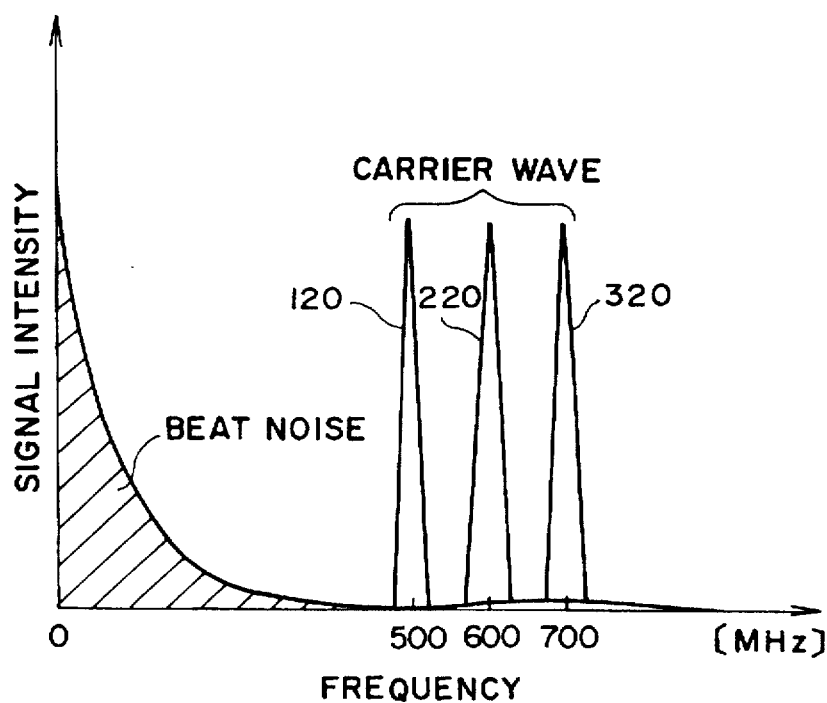
FIG. 12 is a diagram showing frequency spectra of a received signal 50 in the eighth embodiment.

FIG. 12 shows frequency spectra of the received signal 50 in this embodiment. In the received signal 50, the carrier waves 120, 220, 320 from the optical network terminals 100, 200, 300 are frequency-multiplexed. The central frequencies of the carrier waves 120, 220 and 320 are respectively 500 MHz, 600 MHz and 700 MHz and each of them is subjected by the picture signal to the FM modulation of 17 MHz in the amount of the peak frequency deviation. By inputting the received signal 50 into the tuner and the FM demodulator, it is possible to take out the picture signal from any desired optical network terminal. The noise which appears in the neighborhood of the DC current in the frequency spectra is the beat noise which develops when the passing beam and the split beam are combined at each optical network terminal. Since this beat noise centers around the DC current, there is substantially no influence to the transmission of the carrier waves 120, 220, 320.

Figure 13:
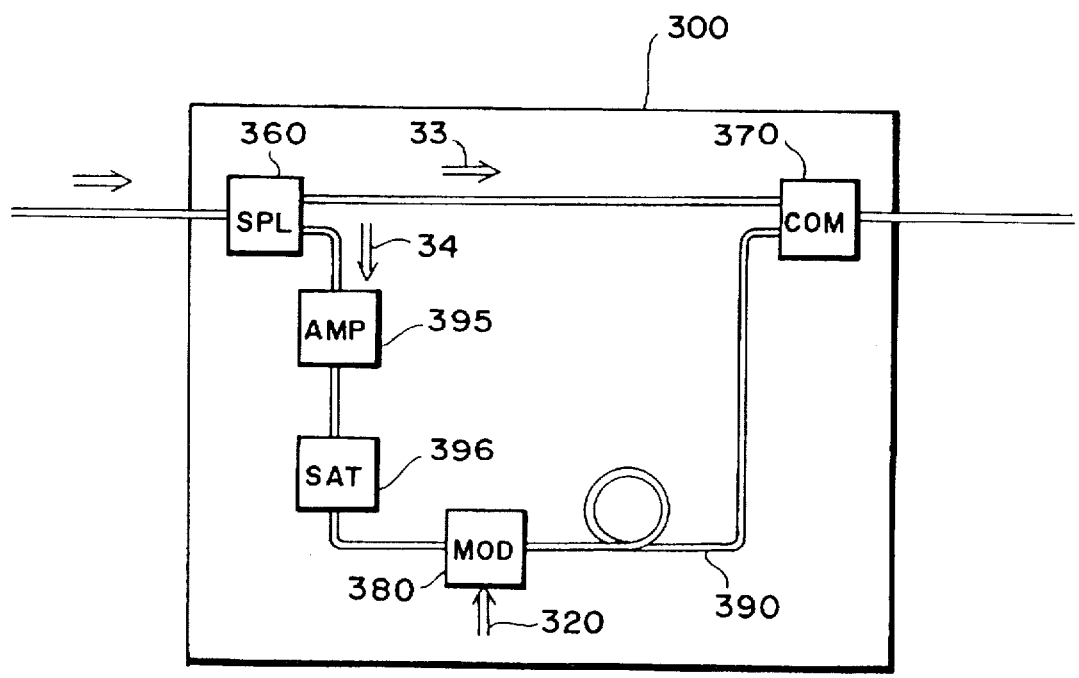
FIG. 13 is a block diagram showing a configuration of an optical network terminal 300 in a ninth embodiment of the invention.

FIG. 13 is a block diagram showing an arrangement of optical network terminals in an ninth embodiment of the invention. The overall configuration of the optical networks is the same as that in the eighth embodiment. Although the optical network terminal 300 shown in FIG. 13 is substantially the same as that of the eighth embodiment, it additionally includes an optical amplifier (AMP) 395 and a gain saturation medium (SAT) 396 which amplify the split beam 34. Traveling wave type semiconductor amplifiers have been used for the optical amplifier 395 and the gain saturation medium 396. As to these semiconductor amplifiers, information is available, for example, in a report by I. Cha et al on "1.5 µm Band Traveling Wave Optical Amplifier with Window Facet Structure, 1989, The Institute of Electronics, Information and Communication Engineers, Spring Conference, C-409.

Figure 14:
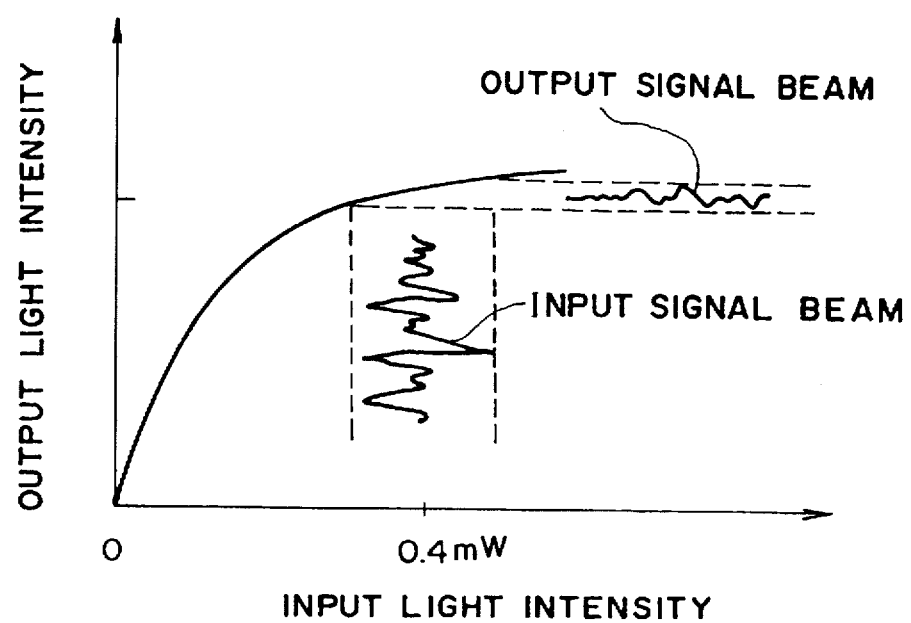
FIG. 14 is a graph showing input/output characteristics of a gain saturation medium 396 used in the ninth embodiment of the invention.

In this embodiment, the average light intensity of the signal beam 30 on being inputted to the optical network terminal 300 was 200 µW and the split ratio between the passing beam 33 and the split beam 34 at the beam splitter 360 was 9 : 1. It follows that the light intensity of the beam inputted to the optical amplifier 395 was 20 µW. The gain of the optical amplifier 395 was 14 dB so that the average light intensity of the split beam 34 was amplified to 0.5 mW. FIG. 14 shows input/output characteristics of the gain saturation medium 396. The gain saturation medium 396 has a gain of about 16 dB when the input signal light intensity is low but, when the split beam of 0.5 mW is inputted, the output intensity remains substantially at a constant value (2 mW) even when the input light intensity varies as shown in FIG.

14. In this embodiment, when the signal beam 30 passes through the optical network terminals 100, 200, it is subjected to intensity-modulation by the carrier waves 120, 220 so that the extent or degree of the optical modulation thereof was about 10% per carrier wave. In comparison with this, the extent of the optical modulation of the split beam 34 after its passage through the gain-saturation medium 396 was reduced to about 1%.

As in the eighth embodiment, the split beam 34 is subjected to intensity-modulation at the optical modulator 380 by the carrier waves 320 and, after passing through the optical delay line 390, is combined to the passing beam 33 by the beam combiner 370. In this embodiment, the optical loss at the optical modulator 380 was −7 dB and the degree of intensity modulation by the carrier waves 320 was 40%. Therefore, the average beam intensity of the split beam 34 after its passage through the optical modulator 380 was 400 μW. Also, the combining ratio between the passing beam 33 and the split beam 34 at the beam combiner 370 was 9:1. It follows that the average light intensity of the passing beam 33 in the output of the beam combiner 370 is 162 μW and the average light intensity of the split beam 34 is 40 μW. In this case, the total light intensity becomes roughly 200 μW so that the optical loss in the entire optical network terminal 300 was substantially zero. Here, the zero/peak amplitudes by the carrier waves 120, 220, 320 in all of these are about 16 μW. Thus, the degree of the intensity modulation by the carrier waves 120, 220, 320 would be about 8%.

In this embodiment, since the intensity modulation of the split beam 34 inputted to the optical modulator 380 is suppressed by the gain saturation medium 396, the distortion to be caused by the cascading of the optical modulators is widely reduced. The intensity ratio (IM2/C) of the secondary intermodulation distortion with respect to the carrier waves by the cascading of the optical modulators was lower than −46 dB, and the intensity ratio (IM3/C) of the tertiary intermodulation distortion with respect to the carrier waves by the cascading of the optical modulators was lower than −92 dB. Without the gain saturation medium 396, the IM2/C was −26 dB and the IM3/C was −52 dB. Thus, by using the gain saturation medium 396, the secondary distortion and the tertiary distortion caused by the cascading of the optical modulators have been improved by 20 dB and 40 dB, respectively.

Figure 15:
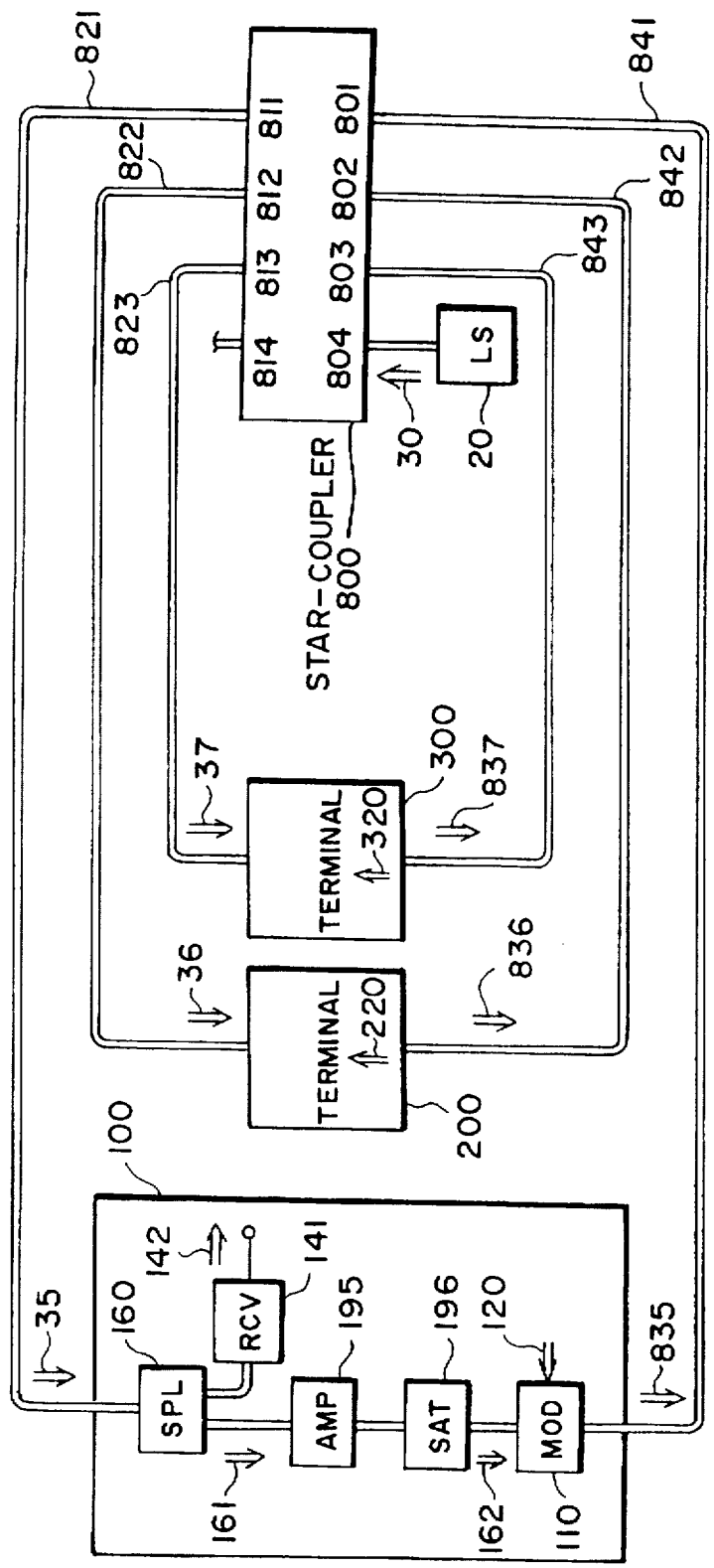
FIG. 15 is a block diagram showing a configuration of optical networks of a tenth embodiment of the invention.

FIG. 15 is a block diagram showing an arrangement of optical networks of a tenth embodiment according to the invention. In this embodiment, a star coupler 800 has four input ports 801, 802, 803, 804 and four output ports 811, 812, 813, 814. The input port 804 receives a signal beam 30 from the light source 20. Signal beams 35, 36, 37 outputted respectively from the output ports 811, 812, 813 are inputted respectively to optical network terminals 100, 200, 300 through optical fibers 821, 822, 823. The port 814 is anti-reflectively terminated. The signal beams 835, 836, 836 outputted from the optical network terminals 100, 200, 300 are respectively inputted to the input ports 801, 802, 803 of the star coupler 800 through the optical fibers 841, 842, 843.

At the optical network terminal 100, a part of the transmitted signal beam 35 is split by the beam splitter 160 and the beam thus split is converted to a radio frequency signal 142 at the signal beam receiver 141. The remaining signal beam 161 is amplified by the optical amplifier 195 and inputted to the gain saturation medium 196. Similarly as in the ninth embodiment, the traveling wave type semiconductor amplifiers were used as the optical amplifier 195 and the gain saturation medium 196. The signal beam 162 outputted from the gain saturation medium 196 is suppressed by the intensity modulation component in the same way as in the ninth embodiment. This signal beam 162 is inputted into the optical modulator 110 and is intensity-modulated by the carrier waves 120. The signal beam 835 outputted from the optical modulator 110 is inputted into the input port 801 of the star coupler 800 through the optical fiber 841. The other optical network terminals 200, 300 are constructed in the same way as the network terminal 100 and the signal beams 836, 837 outputted from the optical network terminals 200, 300 are intensity-modulated by respective carrier waves 220, 320.

The signal beams 835, 836, 837 outputted respectively from the optical network terminals 100, 101, 102 and the light beam 30 outputted from the light source 20 are split and combined at the star coupler 800 and are outputted from the star coupler 800 as the signal beams 35, 36, 37. Therefore, in the received signal 142 from the light receiver 141 of, for example, the optical network terminal 100, the carrier waves 120, 220, 320 are frequency-multiplexed so that, by selecting (selecting a station) and demodulating the same, it is possible to receive signals from the optical network terminals 200, 300. Thus, in this embodiment, it is possible to transmit mutually among the optical network terminals 100, 200, 300.

The signal beams 30, 835, 836, 837 outputted from the optical network terminals 100, 200, 300 and the light source 20 all have the same wavelength. Therefore, even when the signal beams 35, 36, 37 combined are received, the beat noise centers around the DC so that there is substantially no influence thereby to the transmission of the respective carrier waves 120, 220, 320.

The signal beam 162 inputted to the optical modulator 110 is such that the intensity modulation component thereof is suppressed by the gain saturation medium 196 and remains substantially unmodulated. Therefore, when this signal beam 162 is modulated by the optical modulator 110, there is substantially no occurrence of the distortions caused by coherence or interaction between carrier waves.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An optical transmission system comprising:
   a light source for generating a signal beam;
   a plurality of light receivers;
   an optical fiber transmission path which carries said signal beam and also couples said light source with said plurality of light receivers; and
   a plurality of network terminals, connected in cascade along said optical transmission system, each of said network terminals including cascade-connected modulators; subcarrier waves having frequencies different from one another being applied to one of said cascade-connected modulators inside each of said network terminals.

2. An optical transmission system according to claim 1, further comprising a beam splitter, placed along the transmission path and after said signal beam has passed through said plurality of network terminals, that divides said signal beam into a plurality of split beams, said plurality of split beams respectively forwarded to said plurality of light receivers.

3. An optical transmission system according to claim 1, which further comprises at least one optical amplifier coupled between said network terminals.

4. An optical transmission system according to claim 1, in which said light source means comprises a plurality of light sources, said carrier waves being such that they modulate a plurality of signal beams outputted respectively from said plurality of light sources when said signal beams pass through said plurality of optical modulators, and said plurality of signal beams having optical frequency intervals whose minimum value is larger than a maximum frequency of said carrier waves.

5. An optical transmission system according to claim 1, in which said light source means comprises a plurality of light sources, said carrier waves being such that they modulate a plurality of signal beams outputted respectively from said plurality of light sources when said signal beams pass through said plurality of optical modulators, and said plurality of signal beams having optical frequency intervals whose maximum value is smaller than a minimum frequency of said carrier waves.

6. An optical transmission system according to claim 1, in which said light source means comprises a plurality of light sources, said carrier waves being such that they modulate a plurality of signal beams outputted respectively from said plurality of light sources when said signal beams pass through said plurality of optical modulators, and said plurality of signal beams having optical line breadths whose minimum value is larger than a maximum frequency of said carrier waves.

7. An optical transmission system according to claim 1, in which said optical fiber transmission path comprises a plurality of transmission lines to which a plurality of signal beams split from a beam outputted from said light source means are respectively applied, said optical modulators being connected in cascades in said plurality of transmission lines, said plurality of signal beams being such that they are combined together after being modulated by said carrier waves upon passing through said plurality of optical modulators and the combined signal beam is received by said light receiving means.

8. An optical transmission system according to claim 1, wherein said plurality of network terminal means respectively include a light receiving means, and wherein said light source means comprises a first light source and a second light source connected respectively to two ends of said optical fiber transmission path, said first and second light sources outputting respectively a first signal beam and a second signal beam which are applied to said optical fiber transmission path from directions opposite to each other, said first and second signal beams being such that they are modulated simultaneously by said carrier waves at each of said network terminal means, are partially split at the same time at each of said network terminal means, and are received by said light receiving means within each of said network terminal means.

* * * * *

UNITED STATES PATENT AND TRADEMARK OFFICE
CERTIFICATE OF CORRECTION

PATENT NO. : 5,751,455
DATED : May 12, 1998
INVENTOR(S) : Makoto SHIBUTANI and Katsumi EMURA It is certified that error(s) appears in the above-identified patent and that said Letters Patent is hereby corrected as shown below:

Column 9, line 13 delete "he" and insert --the--.
Column 11, line 54 delete "836" and insert --837--.
Column 12, line 12 delete "101, 102" and insert --200, 300--.

Signed and Sealed this

Seventeenth Day of November, 1998

Attest:

BRUCE LEHMAN

*Attesting Officer*          *Commissioner of Patents and Trademarks*